(12) United States Patent
Fukushima

(10) Patent No.: US 8,188,625 B2
(45) Date of Patent: May 29, 2012

(54) OIL COOLING SYSTEM FOR MOTOR

(75) Inventor: Tomohiro Fukushima, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 197 days.

(21) Appl. No.: 12/544,817

(22) Filed: Aug. 20, 2009

(65) Prior Publication Data

US 2010/0052441 A1  Mar. 4, 2010

(30) Foreign Application Priority Data

Aug. 28, 2008  (JP) ................................. 2008-219100

(51) Int. Cl.
 *H02K 9/19* (2006.01)
(52) U.S. Cl. ......................................................... 310/54
(58) Field of Classification Search ................... 310/54, 310/59; H02K 9/19
 See application file for complete search history.

(56) References Cited

U.S. PATENT DOCUMENTS

| | | | |
|---|---|---|---|
| 4,959,570 A * | 9/1990 | Nakamura et al. ............. | 310/54 |
| 5,633,543 A * | 5/1997 | Jarczynski et al. ............ | 310/59 |
| 5,718,302 A | 2/1998 | Hasebe et al. | |
| 6,579,202 B2 * | 6/2003 | El-Antably et al. .......... | 475/159 |
| 7,009,317 B2 * | 3/2006 | Cronin et al. ................... | 310/54 |
| 7,397,154 B2 * | 7/2008 | Tilton et al. .................... | 310/54 |
| 2010/0052441 A1 * | 3/2010 | Fukushima ..................... | 310/54 |

FOREIGN PATENT DOCUMENTS

| | | | |
|---|---|---|---|
| JP | 8-130856 A | | 5/1996 |
| JP | 2003-224945 | * | 8/2003 |
| JP | 2003-324901 | * | 11/2003 |
| JP | 2004-072812 | * | 3/2004 |
| JP | 2007-116807 | * | 5/2007 |

OTHER PUBLICATIONS

Machine Translation of JP 2007-116807, "Vertical Motor Generator", Oct. 2005, Nakao Kiyoharu.*
Macine Translation of JP 2003-224945, Aug. 2003, cooling structure of stator in dynamo-electric machine, Uehara Yoshitaka.*
Manual Translation of JP 15-324901, (2003-324901) Matsui et al, "Motor", Nov. 14, 2003.*
Machine Translation of JP 2004-072812, "dynamoelectric machine", Mar. 4, 2004, Mamoru Kono.*

* cited by examiner

*Primary Examiner* — Karl Tamai
(74) *Attorney, Agent, or Firm* — Buchanan Ingersoll & Rooney PC

(57) ABSTRACT

An oil cooling system for a motor includes a rotor, a stator core annularly positioned around the rotor, a plurality of coils annularly arranged and each wound around the stator core, and a plurality of oil discharging holes annularly arranged in a circumferential direction of the stator core, the oil discharging holes through which oil is discharged with pressure in an axial direction of the stator core to cool the coils.

9 Claims, 3 Drawing Sheets

OIL COOLING SYSTEM FOR MOTOR

CROSS REFERENCE TO RELATED APPLICATIONS

This application is based on and claims priority under 35 U.S.C. §119 to Japanese Patent Application 2008-219100, filed on Aug. 28, 2008, the entire content of which is incorporated herein by reference.

TECHNICAL FIELD

This disclosure relates to an oil cooling system for a motor.

BACKGROUND

A known oil cooling system for a motor is disclosed in JPH08 (1996)-130856A. According to the known oil cooling system for the motor disclosed in JPH08 (1996)-130856A, an oil discharging portion for cooling coils is positioned above an coil end, and the coils positioned at an upper portion of the motor is cooled by the oil discharged with pressure through the oil discharging portion positioned at the upper portion of the motor towards the coil end positioned at a lower level relative to the oil discharging portion in a radial direction of the motor.

According to the construction of the known oil cooling system for the motor disclosed in JPH08 (1996)-130856A, because the oil discharging portion is positioned at the upper portion of the motor, the oil is not sprayed on or applied to the coils provided at a bottom portion of the motor. Because the coils, on which the oil is not sprayed on or applied to, is not cooled by the oil, the temperature thereof increases compared to the coil to which the oil is applied. In order to control the temperature of a motor, it is necessary to limit the temperature of the coil having the highest temperature. Thus, according to the construction of the known oil cooling system for the motor disclosed in JPH08 (1996)-130856A, a thermal rating is not improved and a size of the motor is increased.

A need thus exists for an oil cooling system for a motor which is not susceptible to the drawback mentioned above.

SUMMARY

According to an aspect of this disclosure, an oil cooling system for a motor, which includes a rotor, a stator core annularly positioned around the rotor, a plurality of coils annularly arranged and each wound around the stator core, and a plurality of oil discharging holes annularly arranged in a circumferential direction of the stator core, the oil discharging holes through which oil is discharged with pressure in an axial direction of the stator core to cool the coils.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Embodiments of the present invention will be explained with reference to illustrations of drawing figures as follows.

According to constructions of the embodiments, a stator core includes plural divided stator cores which are annularly arranged and each having a coil. An oil-discharging hole is positioned facing a clearance between the adjacent coils or between the adjacent divided stator cores.

According to constructions of the embodiments, each of the divided stator cores includes an insulator which projects inward in a radial direction of a motor. The clearance between the adjacent divided stator cores or the adjacent insulators is closed. More particularly, the clearance between the adjacent divided stator cores or the adjacent insulators is closed at a side thereof positioned at an inner side relative to the other side thereof in a radial direction of the stator core.

According to constructions of the embodiments, the oil cooling system for the motor includes an oil passage arranged in a circumferential direction, which is formed on a casing (housing) of the motor, extends along a circumferential direction of the motor, and supplies the oil to the plural oil-discharging holes.

According to constructions of the embodiments, the oil cooling system for the motor includes an oil inlet through which the oil is supplied to the oil passage arranged in the circumferential direction. Further, among the plural oil discharging holes, the oil discharging hole positioned closer to the oil inlet has a smaller diameter than the oil discharging hole positioned further from the oil inlet. In other words, a diameter of each of the plural oil discharging holes is set to be gradually increased as the position becomes distant from the oil inlet.

Figure 1:
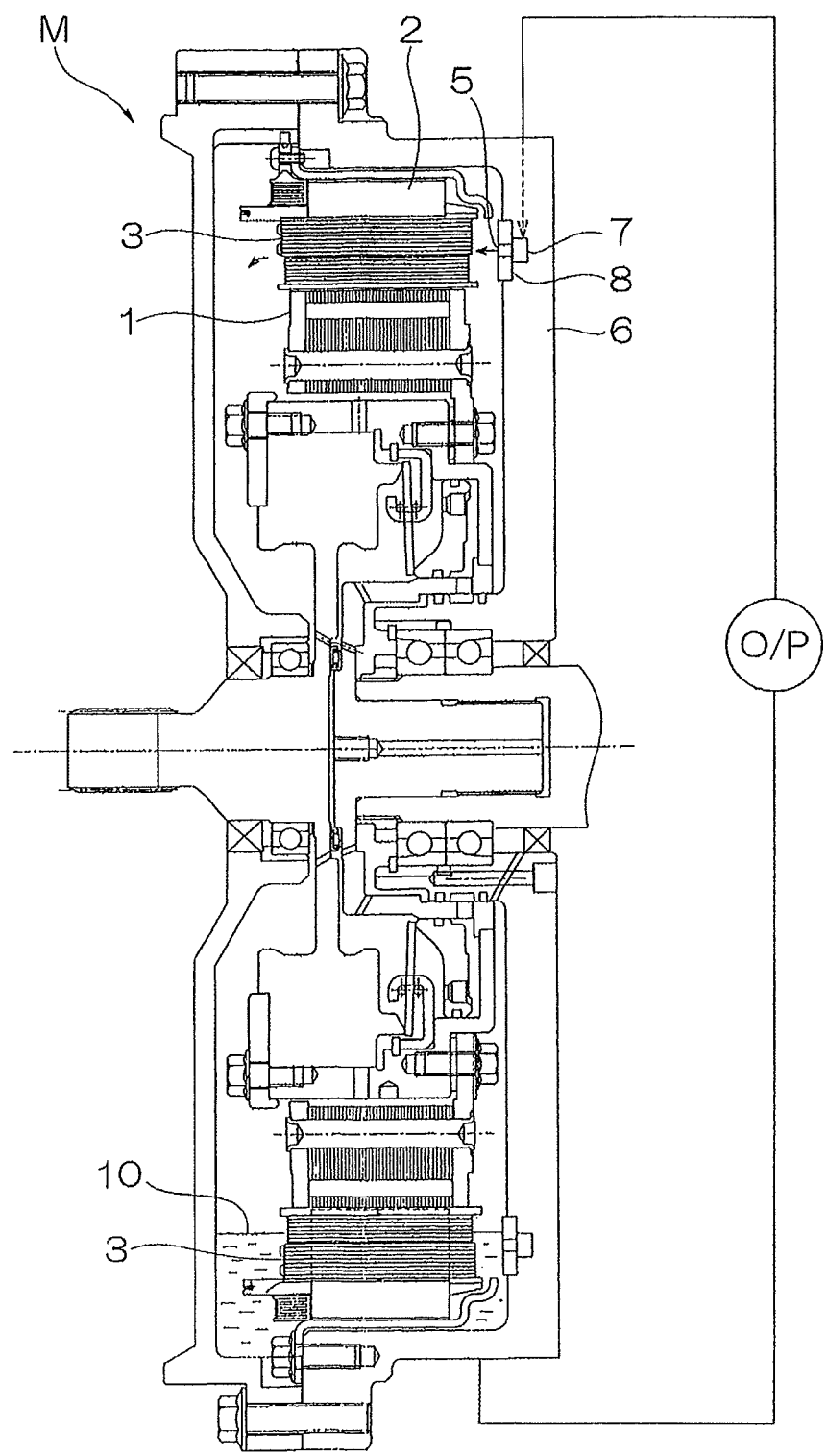
FIG. 1 is a cross-sectional view showing a cooling system for a motor according to a first embodiment of the present invention.
Figure 2:
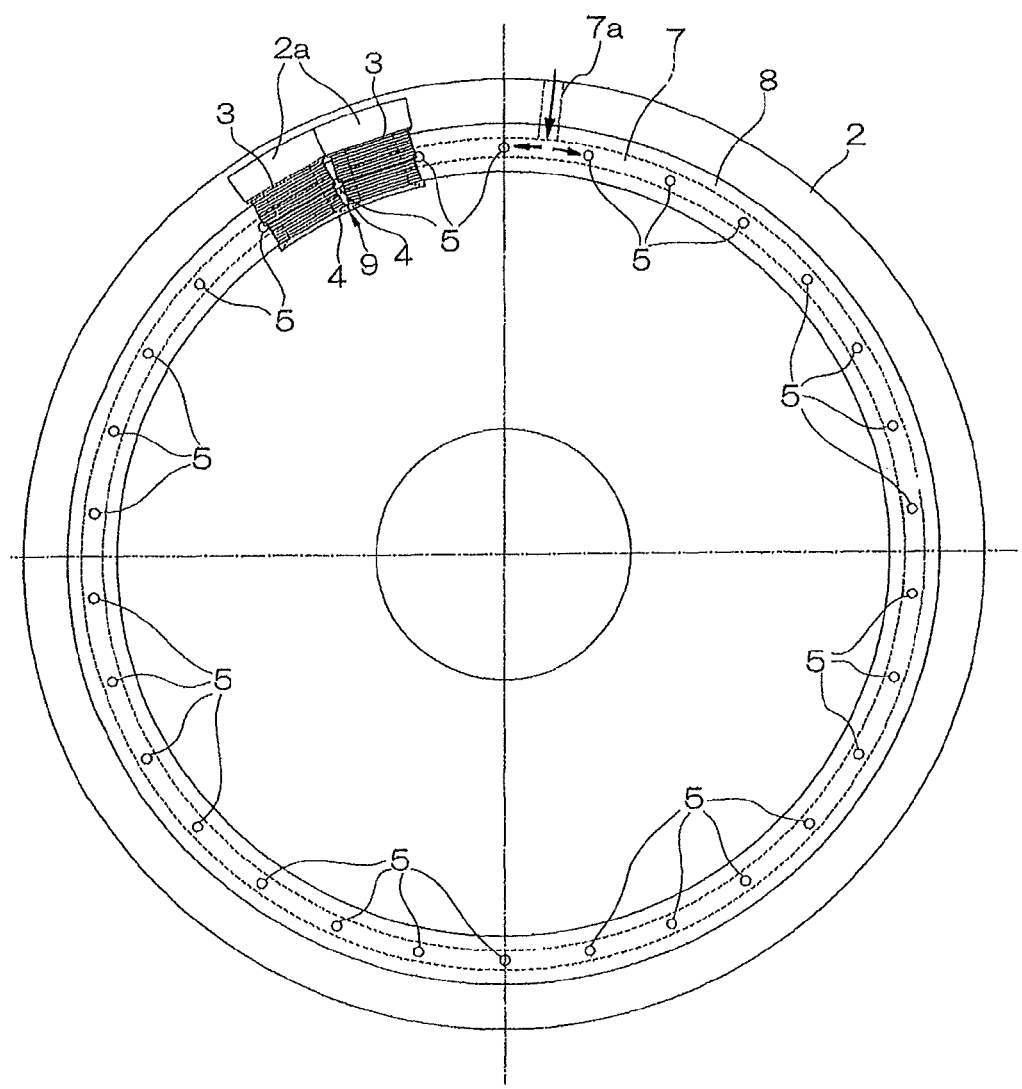
FIG. 2 is a plane view showing a main portion of the cooling system for the motor according to the first embodiment of the present invention.

A first embodiment will be explained with reference to FIGS. 1 and 2. As shown in FIGS. 1 and 2, a motor M includes a stator core 2 which is annularly arranged around a rotor 1, and plural coils 3 which are wounded around the stator core 2 and arranged annularly.

The stator core 2 includes plural divided stator cores 2a each having the coil 3 and being arranged annularly. Each of the divided stator cores 2a includes an insulator 4 which projects inward in a radial direction of the motor M.

According to the embodiment, the oil cooling system for the motor M includes plural oil discharging holes 5 which are arranged in a circumferential direction of the motor M and through which the oil is discharged with pressure in an axial direction of the motor M to cool plural coils 3. Each of the oil discharging holes 5 is positioned facing a clearance between adjacent divided stator cores 2a, 2a or between adjacent coils 3, 3.

A circumferential passage 7 through which the oil is supplied to the plural oil discharging holes 5 is formed on an inner wall of a housing 6 which houses the rotor 1 and the stator core 2. The circumferential passage 7 extends in a circumferential direction of the motor M. The oil is supplied from an oil pump O/P to the circumferential passage 7 via an oil inlet 7a. An annular oil passage cover 8 is provided to cover an opening of the circumferential passage 7. The plural oil discharging holes 5 are formed on the annular oil passage cover 8 with predetermined intervals.

The clearance between the adjacent divided stator cores 2a, 2a is closed at an inner side in a radial direction of the divided stator cores 2a, 2a by means of a contact of the insulators 4, 4 provided at the divided stator cores 2a, 2a. Accordingly, an axial oil passage 9 is formed by the adjacent divided stator cores 2a, 2a, the adjacent coils 3, 3, and the adjacent insulators 4, 4. The oil is reserved at a bottom portion of the housing as indicated with a liquid surface 10 in FIG. 1.

A method for cooling a stator core of the oil cooling system of the motor according to the embodiment will be explained hereinafter. An oil flow is indicated with an arrowed line in FIG. 1. As shown in FIGS. 1 and 2, the oil is supplied from the oil pump O/P to the plural oil discharging holes 5 via the oil inlet 7a and the circumferential passage 7 with a predetermined pressure. The oil is discharged with the pressure from the plural oil discharging holes 5 towards the clearances between the adjacent coils 3 to be introduced to the axial oil passage 9. The oil is discharged from the oil discharging holes 5 with pressure in an axial direction of the stator core 2. The oil discharged from the plural oil discharging holes 5 is also sprayed, or applied on surfaces of the coils 3 positioned facing a side of the housing 6 on which the circumferential passage 7 is formed. Thus, the oil is applied to all of the coils 3. Because the oil reaches the opposite side of the coils 3 which does not face the oil discharging holes 5 through the axial oil passage 9, a contact area of the oil with the coils 3 is increased. Accordingly, a performance for cooling the coil can be enhanced.

A second embodiment will be explained as follows. Constructions that are different from the first embodiment will be explained, and the explanations for the structures common to the first embodiment will not be repeated.

Figure 3:
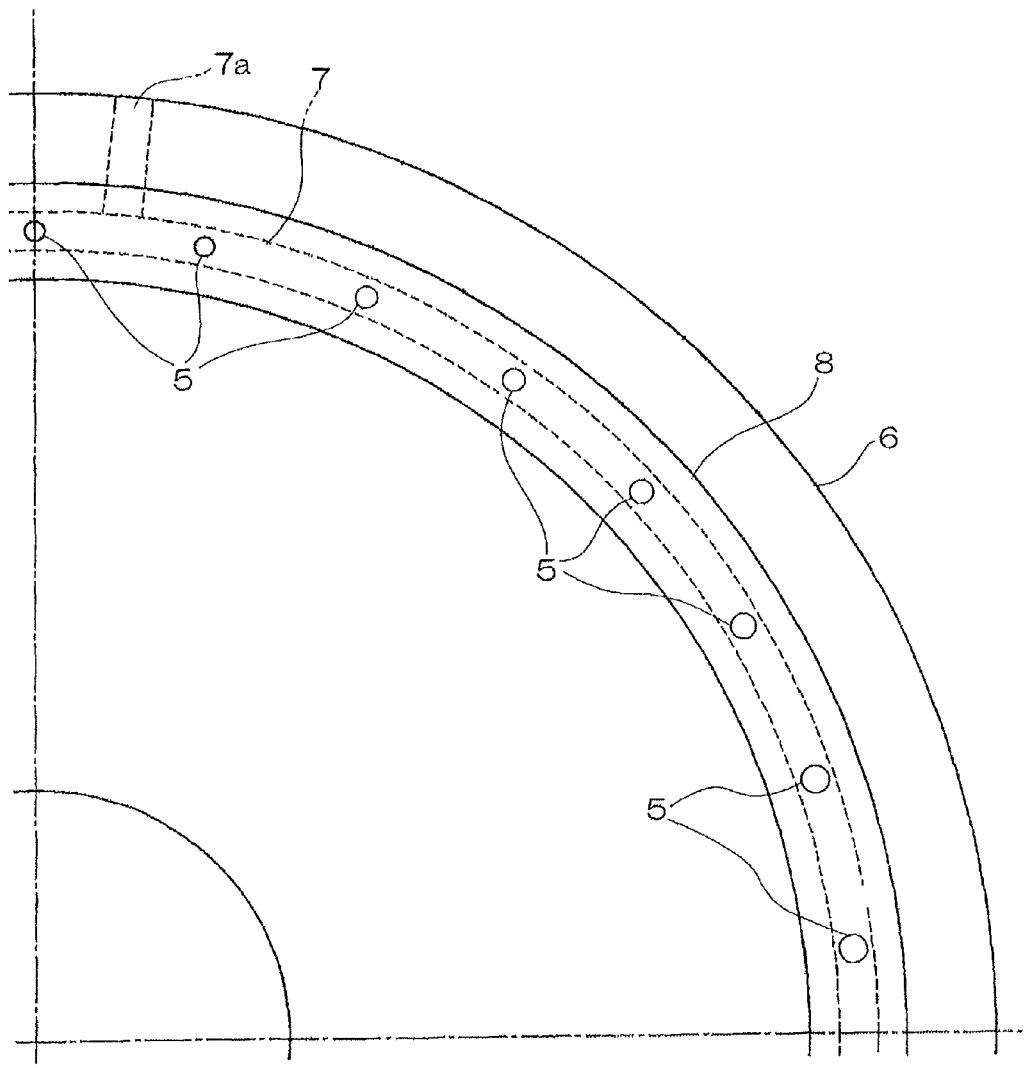
FIG. 3 is a partial plane view showing a cooling system for a motor according to a second embodiment of the present invention.

As shown in FIG. 3, with a construction of an oil cooling system for a motor according to the second embodiment, a diameter of each of the plural oil discharging holes 5 is set to be gradually increased as the position becomes distant from the oil inlet 7a. According to the foregoing constructions, an adequate amount of the oil is discharged with the pressure from the oil discharging holes 5 at which a level of the pressure for discharging the oil tends to decline because of being away from the oil inlet 7a, and thus the coil 3 is cooled with the adequate amount of oil.

The oil cooling system for the motor according to the embodiments may be applied to a motor for a hybrid vehicle or a motor for an electric vehicle.

According to the embodiments, irrespective of the positions of the coils 3 the oil is directly supplied to all the coils 3 in the axial direction of the motor M. Further, according to the constructions of the embodiments, because the oil discharged from one side of the motor M in the axial direction reaches the other side of the motor M in the axial direction, the contact areas of the oil with the coils 3 is increased. Accordingly, the oil cooling system of the motor with high coil cooling performance is provided.

According to the construction of the embodiments, the stator core 2 includes the plural divided stator cores 2a annularly arranged and each having the coil 3, and the oil discharging hole 5 is arranged facing a clearance between the divided stator cores 2a adjacent to each other or between the coils 3 adjacent to each other.

According to the construction of the embodiments, each of the divided stator cores 2a includes the insulator 4 projecting in a radially inward direction of the motor M, and the clearance between the adjacent insulators 4 is closed.

According to the construction of the embodiments, the oil cooling system for the motor further includes the axial oil passage 9 formed by the adjacent divided stator cores 2a, the coil 3, and the insulator 4.

According to the construction of the embodiments, the oil cooling system for the motor further includes the circumferential oil passage 7 formed on the housing 6 of the motor M and extending in a circumferential direction of the motor M. The circumferential oil passage 7 suplies the oil to the plural oil discharging holes 5.

According to the construction of the embodiment, the oil cooling system for the motor further includes the oil inlet 7a for supplying the oil to the circumferential oil passage 7, and the diameter of each of the oil discharging holes 5 is set to be increased as the position becomes distant from the oil inlet 7a.

According to the construction of the embodiments, the oil cooling system for the motor further includes the annular oil passage cover 8 covering the opening of the circumferential oil passage 7.

According to the construction of the embodiments, the oil discharging holes 5 are formed on the annular oil passage cover 8 with predetermined intervals.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An oil cooling system for a motor, comprising:
a housing possessing an inner wall:
a rotor housed in the housing;
a stator core annularly positioned around the rotor and housed in the housing;
a plurality of coils annularly arranged and each wound around the stator core;
a circumferential passage on an inner wall of the housing, the circumferential passage extending in a circumferential direction of the motor;
an annular oil passage cover covering an opening of the circumferential passage;
a plurality of oil discharging holes annularly arranged in a circumferential direction of the stator core, the oil discharging holes through which oil is discharged with pressure in an axial direction of the stator core to cool the coils, the plurality of oil discharging holes being provided on the annular oil passage cover;
an oil inlet through which is supplied the oil from an oil pump, the oil inlet being positioned at an upper side of the circumferential passage, the oil inlet being positioned between two circumferentially adjacent ones of the oil discharging holes
a circumferential oil passage formed on a housing of a motor and extending in a circumferential direction of the motor, the circumferential oil passage supplying the oil to a plurality of the oil discharging holes;
an oil inlet for supplying the oil to the circumferential oil passage; and wherein
a diameter of each of the oil discharging holes is set to be increased as the position becomes distant from the oil inlet.

2. The oil cooling system for the motor according to claim 1, wherein the stator core comprises a plurality of divided stator cores annularly arranged and each having the coil; and the oil discharging hole is arranged facing a clearance between the divided stator cores adjacent to each other or between the coils adjacent to each other.

3. The oil cooling system for the motor according to claim 2, wherein each of the divided stator cores comprises an insulator projecting in a radially inward direction of the motor; and the clearance between the adjacent insulators is closed.

4. The oil cooling system for the motor according to claim 3, further comprising:

an axial oil passage formed by the adjacent divided stator cores, the coil, and the insulator.

5. The oil cooling system for the motor according to claim 1, wherein the oil discharging holes are formed on the annular oil passage cover with predetermined intervals.

6. The oil cooling system for the motor according to claim 2, wherein the oil discharging holes are formed on the annular oil passage cover with predetermined intervals.

7. The oil cooling system for the motor according to claim 3, wherein the oil discharging holes are formed on the annular oil passage cover with predetermined intervals.

8. The oil cooling system for the motor according to claim 4, wherein the oil discharging holes are formed on the annular oil passage cover with predetermined intervals.

9. The oil cooling system for the motor according to claim 1, wherein the oil is reserved at a bottom portion of the housing.

* * * * *